United States Patent
Challa (12) 
(10) Patent No.: US 12,534,630 B2
(45) Date of Patent: *Jan. 27, 2026

(54) NANOPOROUS CERIUM OXIDE NANOPARTICLE MACRO-STRUCTURES IN PAINTS AND COATINGS

(71) Applicant: Xheme Inc., Newton, MA (US)

(72) Inventor: Siva Sai Ramana Kumar Challa, Newton, MA (US)

(73) Assignee: XHEME, INC., Newton, MA (US)

( * ) Notice: Subject to any disclaimer, the term of this patent is extended or adjusted under 35 U.S.C. 154(b) by 789 days.

This patent is subject to a terminal disclaimer.

(21) Appl. No.: 17/584,803

(22) Filed: Jan. 26, 2022

(65) Prior Publication Data

US 2023/0257599 A1    Aug. 17, 2023

(51) Int. Cl.
- C09D 7/61      (2018.01)
- C01F 17/235    (2020.01)
- C09D 5/02      (2006.01)
- C09D 7/40      (2018.01)

(52) U.S. Cl.
CPC .............. C09D 7/61 (2018.01); C01F 17/235 (2020.01); C09D 5/024 (2013.01); C09D 7/67 (2018.01); *C01P 2004/64* (2013.01); *C01P 2006/16* (2013.01)

(58) Field of Classification Search
CPC . C09D 7/61; C09D 5/024; C09D 7/67; C09D 5/00; C09D 5/028; C09D 7/62; C09D 7/65; C09D 7/68; C09D 7/69; C09D 7/70; C01F 17/235; C01P 2004/64; C01P 2006/16

See application file for complete search history.

(56) References Cited

U.S. PATENT DOCUMENTS

| | | |
|---|---|---|
| 5,167,657 A | 12/1992 | Patel |
| 5,496,359 A | 3/1996 | Davidson |
| 5,607,992 A | 3/1997 | Chiba et al. |
| 5,938,837 A | 8/1999 | Hanawa et al. |
| 6,752,979 B1 | 6/2004 | Talbot et al. |
| 6,932,959 B2 | 8/2005 | Sterte et al. |
| 7,534,453 B1 | 5/2009 | Rzigalinski et al. |
| 7,955,431 B2 | 6/2011 | Bousseau et al. |
| 8,317,888 B2 | 11/2012 | Criniere |
| 8,349,764 B2 * | 1/2013 | Burba, III ............ B01J 20/0207  502/402 |

(Continued)

FOREIGN PATENT DOCUMENTS

| | | |
|---|---|---|
| BR | 102016006496 | 9/2017 |
| BR | 102016006496 A2 | 9/2017 |

(Continued)

OTHER PUBLICATIONS

English machine translation of Hao et al, CN-104150525-A, Nov. 19, 2014. (Year: 2025).*

(Continued)

*Primary Examiner* — Coris Fung
*Assistant Examiner* — Caroline D. Liott
(74) *Attorney, Agent, or Firm* — Grossman, Tucker, Perreault & Pfleger, PLLC (57) ABSTRACT

The present invention is directed to nanoporous cerium oxide nanoparticle (NCeONP) macro-structures in paints and coating formulations.

21 Claims, 6 Drawing Sheets

(56) References Cited

U.S. PATENT DOCUMENTS

| | | | |
|---|---|---|---|
| 8,410,206 | B2 | 4/2013 | Berkei et al. |
| 8,747,907 | B2 | 6/2014 | Rzigalinski et al. |
| 9,649,337 | B2 | 5/2017 | Rzigalinski et al. |
| 9,732,427 | B2 | 8/2017 | Poxson et al. |
| 9,909,033 | B2 | 3/2018 | Criniere et al. |
| 10,385,219 | B2 | 8/2019 | Siebert et al. |
| 11,518,838 | B2 | 12/2022 | Kono et al. |
| 2004/0009542 | A1 | 1/2004 | Dumont et al. |
| 2011/0293941 | A1* | 12/2011 | Chaumonnot ........... B01J 21/02 977/773 |
| 2011/0315567 | A1 | 12/2011 | Boynton et al. |
| 2012/0031827 | A1 | 2/2012 | Burba et al. |
| 2013/0078547 | A1 | 3/2013 | Park et al. |
| 2014/0179870 | A1 | 6/2014 | Kondo |
| 2015/0093543 | A1 | 4/2015 | Kushida et al. |
| 2015/0140317 | A1 | 5/2015 | Biberger et al. |
| 2017/0121511 | A1 | 5/2017 | Li et al. |
| 2018/0282548 | A1 | 10/2018 | Buissette et al. |
| 2020/0024452 | A1 | 1/2020 | Todoroki et al. |
| 2020/0385591 | A1 | 12/2020 | Steveninck |
| 2021/0074991 | A1* | 3/2021 | Gaben ................. H01M 4/0404 |
| 2021/0235690 | A1 | 8/2021 | Rzigalinski et al. |
| 2023/0035874 | A1* | 2/2023 | Challa ................. C09D 11/037 |

FOREIGN PATENT DOCUMENTS

| | | | |
|---|---|---|---|
| CA | 2310461 | | 6/1999 |
| CA | 2310461 | A1 | 6/1999 |
| CN | 101948247 | | 1/2011 |
| CN | 101948247 | A | 1/2011 |
| CN | 102787491 | | 4/2014 |
| CN | 102787491 | B | 4/2014 |
| CN | 103849174 | | 6/2014 |
| CN | 103849174 | A | 6/2014 |
| CN | 104150525 | A * | 11/2014 |
| CN | 106634124 | | 5/2017 |
| CN | 106634124 | A | 5/2017 |
| CN | 111961251 | | 11/2020 |
| CN | 111961251 | A | 11/2020 |
| CN | 112094493 | | 12/2020 |
| CN | 112520215 | | 3/2021 |
| CN | 112520215 | A | 3/2021 |
| DE | 19751448 | | 5/1999 |
| DE | 19751448 | A | 5/1999 |
| EP | 1362892 | | 11/2003 |
| EP | 1362892 | A1 | 11/2003 |
| EP | 1974808 | | 10/2008 |
| EP | 1974808 | A1 | 10/2008 |
| EP | 3795644 | | 3/2021 |
| EP | 3795644 | A1 | 3/2021 |
| JP | H10182395 | | 7/1998 |
| JP | H10182395 | A | 7/1998 |
| JP | 3048000 | | 6/2000 |
| JP | 3048000 | B2 | 6/2000 |
| JP | 2010-89280 | | 4/2010 |
| JP | 2010089280 | A | 4/2010 |
| JP | 6610168 | | 11/2019 |
| JP | 6610168 | B2 | 11/2019 |
| WO | 91/11349 | | 8/1991 |
| WO | 9111349 | A2 | 8/1991 |
| WO | 01/36332 | | 5/2001 |
| WO | 02/42201 | | 5/2002 |
| WO | 2007/002662 | | 1/2007 |
| WO | 2015/197656 | | 12/2015 |
| WO | 2016/014037 | | 1/2016 |
| WO | 2016014037 | A1 | 1/2016 |
| WO | WO-2016160790 | A1 * | 10/2016 ........... C01F 17/0018 |
| WO | 2017/062573 | | 4/2017 |
| WO | 2017062573 | A1 | 4/2017 |
| WO | 2019/082903 | | 5/2019 |
| WO | 2020/023932 | | 1/2020 |
| WO | 2020023932 | A1 | 1/2020 |
| WO | 2021/089110 | | 5/2021 |

OTHER PUBLICATIONS

Ozkan et al, "Comprehensive Characterization of a Mesoporous Cerium Oxide Nanomaterial with High Surface Area and High Thermal Stability," 2021, Langmuir, 37, pp. 2563-2574. (Year: 2021).*

Pang et al, "Solvothermal synthesis of nano-CeO2 aggregates and its application as high-efficient arsenic adsorbent," 2019, Rare Metals, 38(1), pp. 73-80. (Year: 2019).*

International Search Report and Written Opinion from corresponding PCT Appln. No. PCT/US2022/074303, dated Oct. 12, 2022. 12 pages.

Written Opinion of the International Search Report from corresponding PCT Appln. No. PCT/US19/43785, dated Dec. 3, 2019. 9 pages.

International Preliminary Report on Patentability from corresponding PCT Appln. No. PCT/US2019/043785, dated Dec. 3, 2019. 10 pages.

Extended European Search Report from related Application No. 19842184.4, dated Aug. 18, 2022. 9 pages.

Charbgoo, et al., "Cerium Oxide Nanoparticles: Green Synthesis and Biological Applications", International Journal of Nanomedicine, Dove Press, Feb. 20, 2017, 12, pp. 1401-1413.

Singh, et al., "Treatment of Neurodegenerative Disorders with Radical Nanomedicine", Annals of the New York Academy of Sciences, 1122, pp. 219-230, Jan. 2008.

International Search Report and Written Opinion from related PCT Appln. No. PCT/US2023/022644, dated Oct. 11, 2023.

International Search Report and Written Opinion from related PCT Appln. No. PCT/US2023/071680, dated Dec. 11, 2023.

Amorati et al., "Tandem Hydroperoxyl-Alkylperoxyl Radical Quenching by an Engineered Nanoporous Cerium Oxide Nanoparticle Macrostructure (NCeONP): Toward Efficient Solid-State Autooxidation Inhibitors", ACS Omega, vol. 8, pp. 40174-40183. Oct. 18, 2023.

International Search Report and Written Opinion from corresponding PCT Appln. No. PCT/US2022/074303, dated Oct. 12, 2022.

International Search Report and Written Opinion from related PCT Appln. No. PCT/US2019/043785, dated Dec. 3, 2019.

Extended European Search Report from related Application No. 19842184.4, dated Aug. 18, 2022.

Zhang et al., "Reinforcement of natural rubber latex with silica modified by cerium oxide: preparation and properties", Journal of Rare Earths, vol. 34, No. 2, 2016, China, pp. 221-226.

Singh et al., "Treatment of Neurodegenerative Disorders with Radical Nanomedicine", Annals of the New York Academy of Sciences, vol. 1122, 2007, New York, pp. 219-230.

Antosik et al., "Vitamin E Analogue Protects Red Blood Cells again Storage-Induced Oxidative Damage", Transfusion Medicine and Hemotherapy, vol. 45, No. 5, 2018, pp. 347-354.

Rzigalinski et al., "Cerium Oxide Nanoparticles Improve Lifespan of Stored Blood", Military Medicine, vol. 185, Jan./Feb. Supplement 2020, U.S., pp. 103-109.

International Search Report and Written Opinion from related PCT Appln. No. PCT/US2022/077776, dated Jan. 5, 2023.

International Search Report and Written Opinion from corresponding PCT Appln. No. PCT/US2022/081272, dated Apr. 4, 2023.

Partial Search Report/Invitation to Pay Additional fees from related PCT Appln. No. PCT/US2023/022644, dated Jul. 26, 2023.

Hassan et al., "Monolithic Cerium Oxide Nanoparticles Assembly for Wearable Electronics", IOP Science, 2021 The Electrochemical Society cited in Invitation to Pay Additional fees from related PCT Appln. No. PCT/US2023/022644.

Maeder et al., "Flame-made ceria nanoparticles", Journal of Materials Research, vol. 17, No. 6, 2002, Pennsylvania, U.S., pp. 1356-1362.

Extended European Search Report from related EPO Appln. No. 22850541.8, dated Jun. 10, 2025.

Asadpour et al., "Effect of Zirconium Dioxide Nanoparticles on Glutathione Peroxidase Enzymen in PC12 and N2a Cell Lines", Iranian Journal of Pharmaceutical Research, vol. 13, No. 4, 2014, Iran, pp. 1141-1148.

(56) References Cited

OTHER PUBLICATIONS

Kozelskaya et al., "Morphological changes of the red blood cells treated with metal oxide nanoparticles", Toxicology in Vitro, vol. 37, 2016, Russia, pp. 34-40.
Extended European Search Report from related EPO Appln. No. 22879525.8, dated Aug. 20, 2025.

* cited by examiner

NANOPOROUS CERIUM OXIDE NANOPARTICLE MACRO-STRUCTURES IN PAINTS AND COATINGS

The present invention is directed to nanoporous cerium oxide nanoparticle (NCeONP) macro-structures in paints and coating formulations.

BACKGROUND

Cerium based oxide compounds have been reported. For example, cerium oxide is an oxide of the rare-earth metal cerium. Cerium oxide nanoparticles have received attention in the scientific literature due to, e.g., their catalytic activity and antioxidant properties. Research to identify and improve upon the performance of cerium oxide nanoparticles therefore remains an on-going research and development focus, to identify additional enhancements to their structure, properties and applications.

In U.S. application Ser. No. 17/390,199, entitled Nanoporous Cerium Oxide Nanoparticle Macro-Structure, there is disclosure of nanoporous cerium oxide nanoparticle macro-structures comprising a plurality of cerium oxide nanoparticles having a diameter in the range of 10 nm to 100 nm present as a macro-structure having macro-structure diameter in the range of 50 nm to 30,000 nm and macro-structure pore diameter in the range of 10 nm to 1100 nm. There is also disclosure of the use of such macro-structures in formulations with a pigment or dye to augment the performance of the pigment and/or dye with regards to, among other things, ability to retain color intensity and resistance to fading on exposure to ultraviolet (UV) radiation.

Research to identify and improve upon the performance of the nanoporous cerium oxide nanoparticle macro-structures remains an on-going need, an in particular, to identify preparation procedures and resulting compositions related to the combination of the macro-structures in paints and coatings to further improve on paint/coating performance.

SUMMARY

A paint or coating formulation comprising nanoporous cerium oxide nanoparticle macro-structure, in a liquid media, comprising a plurality of cerium oxide nanoparticles having a diameter in the range of 10 nm to 100 nm present as a macro-structure having macro-structure diameter in the range of 50 nm to 30,000 nm and macro-structure pore diameter in the range of 10 nm to 1100 nm.

A paint or coating formulation comprising: (a) nanoporous cerium oxide nanoparticle macro-structure comprising a plurality of cerium oxide nanoparticles having a diameter in the range of 10 nm to 100 nm present as a macro-structure having: (1) a macro-structure diameter in the range of 10 nm to 300 nm and a macro-structure pore diameter in the range of 5 nm to 30 nm; and (2) a macro-structure diameter in the range of 5,000 nm to 30,000 nm and a macro-structure pore diameter in the range of 900 nm to 1100 nm; and (b) a liquid.

A method of forming a paint or coating comprising: (a) supplying nanoporous cerium oxide nanoparticle macro-structure comprising a plurality of cerium oxide nanoparticles having a diameter in the range of 10 nm to 100 nm present as a macro-structure having macro-structure diameter in the range of 50 nm to 30,000 nm and macro-structure pore diameter in the range of 10 nm to 1100 nm; and (b) forming a polymer emulsion by polymerizing one or a plurality of monomers in aqueous medium in the presence of an emulsifier and during said polymerization, adding said nanoporous cerium oxide nanoparticle macrostructure.

A method of forming an emulsion-based paint or coating comprising: (a) supplying nanoporous cerium oxide nanoparticle macro-structure comprising a plurality of cerium oxide nanoparticles having a diameter in the range of 10 nm to 100 nm present as a macro-structure having macro-structure diameter in the range of 50 nm to 30,000 nm and macro-structure pore diameter in the range of 10 nm to 1100 nm; and (b) supplying a polymer emulsion and adding said nanoporous cerium oxide nanoparticle macro-structure to said polymer emulsion.

BRIEF DESCRIPTION OF THE DRAWINGS

Aspects of the present disclosure may be appreciated upon review of the description herein and the accompanying drawings which identify as follows.

DETAILED DESCRIPTION OF PREFERRED EMBODIMENTS

The present disclosure is directed at preparation procedures and resulting compositions related to the combination of nanoporous cerium oxide nanoparticle macro-structures in paints and coatings to improve on paint/coating performance.

The paints or coatings preferably include emulsion-based paints or coatings that contain a preferred level of pigment or dye in a liquid media, or which also may be applied as a clear coat without pigment or dye loading. Reference to a pigment is reference to insoluble particles that impart a color to the liquid media and reference to a dye is a colorant that is soluble in the liquid media.

Reference herein to an emulsion-based paint or coating is reference to polymer that is polymerized from monomer in an aqueous medium along with emulsifier (preferably non-ionic emulsifier). The emulsifier is typically a hydrophobic-hydrophilic type compounds that maintains the parts of the emulsion in a mixed state. The monomer is initially emulsified in water with the emulsifier to form micelles and the monomers preferably undergo a free-radical polymerization to form polymer which then serves as the binder (binding the pigment and providing adhesion and integrity to the dry paint film that is ultimately formed). The initiators utilized are preferably water soluble free-radical initiators that are introduced into the water phase and which react with the monomers in the micelles to promote polymerization.

The paints or coatings herein may also include suspension based paints or coatings, which typically contains three components, polymer (binder), pigment and solvent. They typically must be mixed or shaken before use due to settling of the pigment. What is commonly known as oil-based paint serves as one example of a paint suspension, where the pigment is suspended in a solvent drying oil, commonly linseed oil.

Figure 1:
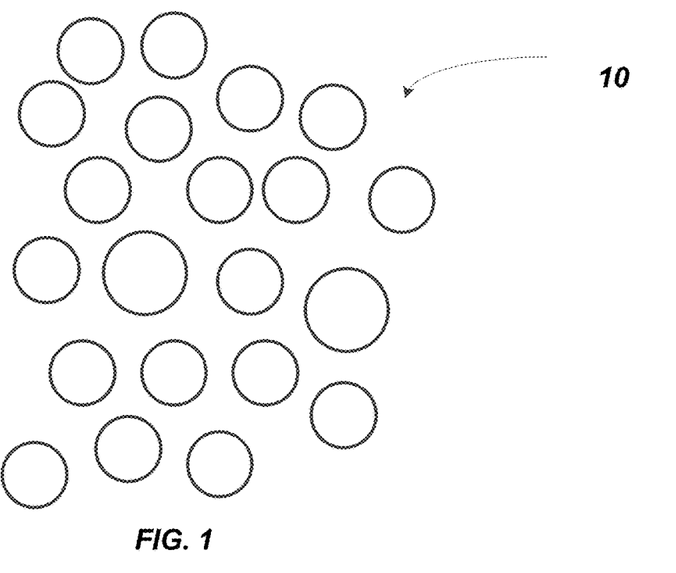
FIG. 1 illustrates cerium oxide nanoparticles.

Reference to a macro-structure is reference to the feature that a plurality of the particles associate or adhere to one another where the macro-structure has its own pore size diameter. With attention to FIG. 1, preferably, the starting cerium oxide nanoparticles 10 preferably have a diameter (largest linear dimension) in the range of 10 nm to 100 nm. More preferably, the cerium oxide nanoparticles employed herein have a diameter in the range of 10 nm to 50 nm or 10 nm to 30 nm or 20 nm to 30 nm.

The above referenced cerium oxide nanoparticles are then preferably degassed with nitrogen for a preferred period of 30 minutes to 60 minutes. This is then preferably followed by heating at elevated temperature, and preferably at the temperature range of 50° C. to 900° C. for a preferred period of 1.0 hour to 3.0 hours, more preferably 1.0 hour to 2.0 hours. Accordingly, such heating of the cerium oxide nanoparticles was observed to form a plurality of nanoporous cerium oxide nanoparticle macro-structures 12 illustrated in FIG. 2 having macro-structure pores 14.

Figure 2:
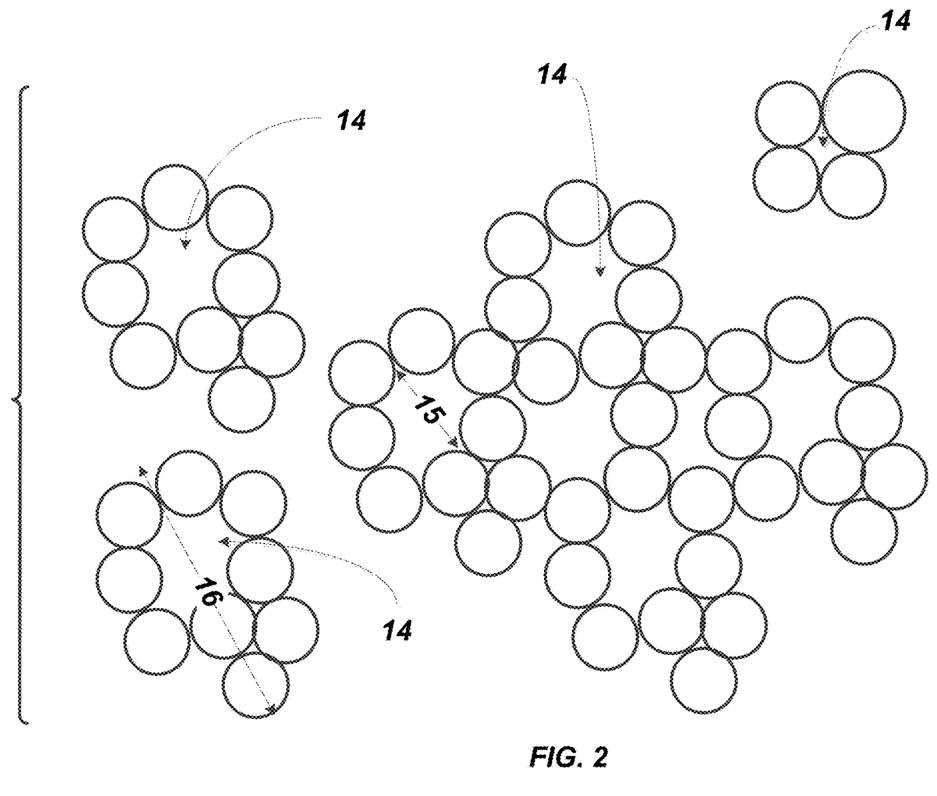
FIG. 2 illustrates the nanoporous cerium oxide nanoparticle (NCeONP) macro-structure formed from the cerium oxide nanoparticles illustrated in FIG. 1.

The macro-structure pores 14 that are formed by the cerium oxide nanoparticle macrostructure 12 preferably have a diameter (largest linear dimension) as indicated by arrow 15 in the range of 10 nm to 1100 nm, more preferably, 10 nm to 750 nm or 10 nm to 500 nm or 10 nm to 250 nm or 10 nm to 100 nm or 10 nm to 50 nm or 10 nm to 25 nm. In addition, the nanoporous cerium oxide nanoparticle macro-structures 12 themselves are contemplated to have a preferred diameter (largest linear dimension) as indicated by arrow 16 in the range of 50 nm to 30,000 nm.

In one particularly preferred embodiment, the nanoporous cerium oxide nanoparticle macro-structures (NCeONP) that are formed herein have a binary size distribution with respect to both their macro-structure diameter 16 and macro-structure pore diameter 15. A binary size distribution is reference to two distributions of size ranges for both the macro-structure diameter and macro-structure pore diameter. That is, the preparation methods herein preferably provide a nanoporous cerium oxide nanoparticle macro-structure that has the following binary size distribution: (1) macro-structure diameter in the range of 10 nm to 300 nm with a macro-structure pore diameter in the range of 5 nm to 30 nm, more preferably 10 nm to 20 nm; and (2) macro-structure diameter in the range of 5,000 nm to 30,000 nm with a macro-structure pore diameter in the range of 900 nm to 1100 nm.

Figure 3:
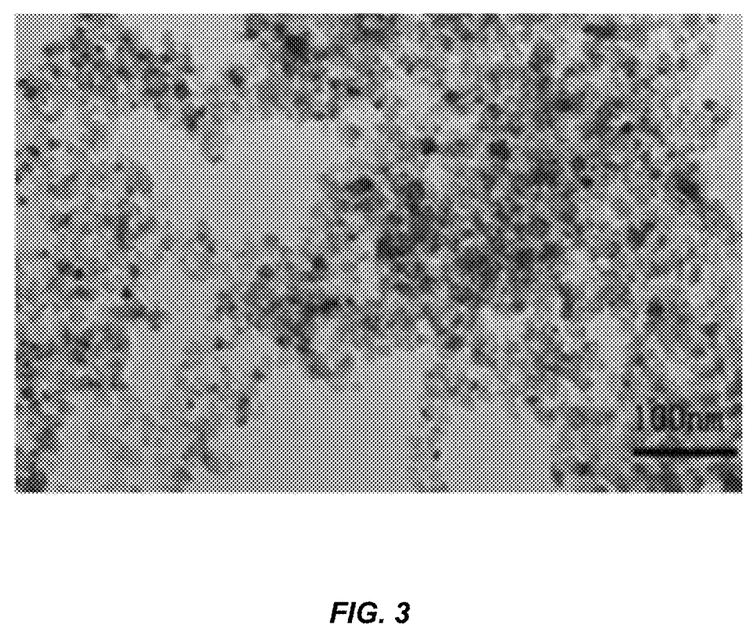
FIG. 3 is a scanning electron micrograph of the cerium oxide nanoparticles employed to form the nanoporous cerium oxide nanoparticle macro-structure.
Figure 4A:
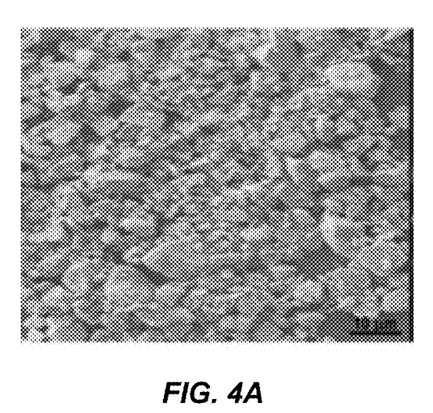
FIG. 4A is a scanning electron micrograph of the nanoporous cerium oxide nanoparticle micro-structure at the indicated magnification.
Figure 4B:
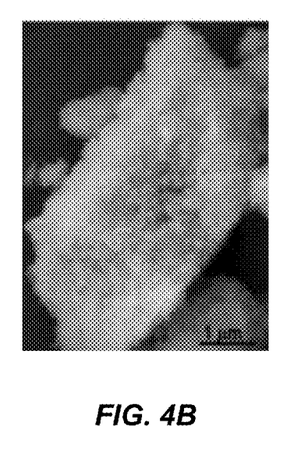
FIG. 4B is another scanning electron micrograph of the nanoporous cerium oxide nanoparticle micro-structure at the indicated magnification.
Figure 4C:
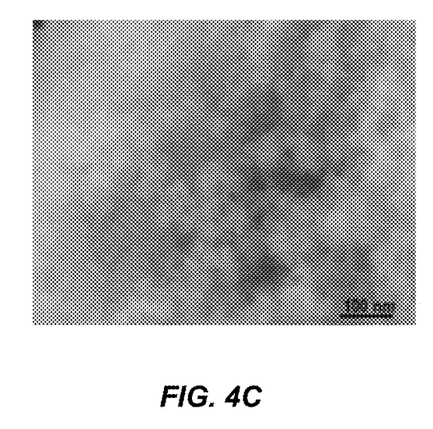
FIG. 4C is another scanning electron micrograph of the nanoporous cerium oxide nanoparticle micro-structure at the indicated magnification.

FIG. 3 is a scanning electron micrograph of the cerium oxide nanoparticles employed herein to form the nanoporous cerium oxide nanoparticle macro-structure. As noted above, such starting cerium oxide nanoparticles preferably had a diameter of 20 nm to 30 nm. FIGS. 4A, 4B and 4C, respectively, provide scanning electron micrographs at increasing magnification showing the nanoporous cerium oxide nanoparticle macro-structure herein formed from the cerium oxide nanoparticles of FIG. 3, wherein the macro-structure itself forms macro-structure pores 14 (see again FIG. 1).

The above referenced NCeONP macro-structures can now be incorporated into a paint or coating formulation, where as noted, the paint or coating formulation may be an emulsion based paint or a suspension based paint.

There are two particularly preferred procedures for formation of a paint or coating formulation herein when it comes to an emulsion based paint: Procedure (1) distribution of the NCeONP macro-structures in situ into a polymerizing polymeric emulsion which formed polymeric emulsion is mixed with a pigment to form the desired paint or coating formulation; or Procedure (2) combination of the NCeONP macro-structures, pigment and a polymeric emulsion to form the desired paint or coating formulation.

For Procedure (1) noted above, the NCeONP macro-structures are preferably incorporated into a polymeric emulsion wherein the macro-structures are preferably incorporated during preparation of the emulsion polymer formulation of interest. That is, the NCeONP are added in situ during the polymerization of the selected monomers that are employed for the emulsion polymerization. Such prepared emulsions can then be evaluated for processability and settling tendency. The representative emulsion polymer formulation was either a styrene-acrylate formulation or an acrylate formulation, which is reference to the emulsion polymerization of styrene and acrylate monomers or the emulsion polymerization of acrylate monomer.

During any such emulsion polymerization, the NCeONP macro-structures were as noted, added to the polymerizing monomers in the emulsion, to therefore provide the resulting emulsified polymer containing the selected level of NCeONP macro-structures additive. Following preparation of such representative polymeric emulsions containing the selected level of NCeONP macro-structures, the emulsions were combined with the desired pigment at the selected level of pigment to provide the paint or coating formulation of interest. A percentage of the NCeONP in the paint or coating was then determined.

As also alluded to above, Procedure (2) involves initial preparation of an emulsion of selected monomers, undergo polymerization, to form a desired polymer in an emulsion, and then addition of pigment and the NCeONP to such polymeric emulsion.

With regards to the emulsion polymerization of selected monomers, as noted, the preferred monomers are either styrene/acrylic or an all acrylic emulsion polymer composition. Such emulsion polymerization are preferably conducted by selecting the desired monomers, and incorporating into a latex medium containing emulsifiers and a polymerization initiator, where the level of monomers is preferably in the range of 45.0% to 55.0% wt., conducting the polymerization at a temperature of around 80.0° C., at an rpm of 210-215, at a batch size of about 1.0 liter.

The results of employing Procedure (1) or (2) above, to provide a paint formulation, are now shown in Table 1 below:

TABLE 1

Paint Formulations Containing CeONP Macrostructures

| Sample | Pigment Volume Concentration (PVC) | Emulsion System | NCeONP Macrostructures Incorporation Via Procedure (1) or Procedure (2) | NCeONP Macrostructures Dosage in Final Paint Emulsion (%) wt. |
|---|---|---|---|---|
| PAINT 1 | HIGH PVC (76%) | Styrene Acrylate | N.A. | 0.0% |
| PAINT 2 | HIGH PVC (76%) | Styrene Acrylate | Procedure (2) | 1.0% |
| PAINT 3 | HIGH PVC (76%) | Pure Acrylate | N.A. | 0.0% |
| PAINT 4 | HIGH PVC (76%) | Pure Acrylate | Procedure (2) | 1.0% |
| PAINT 5 | LOW PVC (33%) | Styrene Acrylate | N.A. | 0.0% |
| PAINT 6 | LOW PVC (33%) | Styrene Acrylate | Procedure (2) | 1.0% |
| PAINT 7 | LOW PVC (33%) | Pure Acrylate | N.A. | 0.0% |
| PAINT 8 | LOW PVC (33%) | Pure Acrylate | Procedure (2) | 1.0% |
| PAINT 9 | HIGH PVC (76%) | Styrene Acrylate | Procedure (2) | 0.25% |
| PAINT 10 | HIGH PVC (76%) | Styrene Acrylate | Procedure (2) | 0.50% |
| PAINT 11 | HIGH PVC (76%) | Styrene Acrylate | Procedure (2) | 1.00% |
| PAINT 12 | HIGH PVC (76%) | Styrene Acrylate | N.A. | 0% |

It is contemplated herein that the level of NCeONP present in a selected paint formulation, either emulsion based or suspension based, may therefore range of 0.01% (wt.) to 10.0% (wt.), or 0.01% (wt.) to 9.0% (wt.), or 0.01% (wt.) to 8.0% (wt.), or 0.01% (wt.) to 7.0% (wt.) or 0.01% (wt.) to 6.0% (wt.), or 0.01% (wt.) to 5.0% (wt.), or 0.01% (wt.) to 4.0% (wt.), or 0.01% (wt.) to 3.0% (wt.), or 0.01% (wt.) to 2.0% (wt.) or 0.01% (wt.) to 1.0% (wt.).

As also can be seen, the emulsion polymer herein may preferably be a styrene-acrylate emulsion which is reference to the emulsion polymerization of styrene monomer and acrylate monomer to provide a random copolymer of polystyrene-co-acrylate. The preferred acrylate herein in such polystyrene-co-acrylate copolymer comprises a polystyrene-butylacrylate copolymer.

In addition, while a pigment volume concentration is identified in the above Table 1, it should be recognized herein that one may avoid the use of pigment, in which case one may readily prepare an emulsion based or suspension based paint or coating formulation, that is clear, and which contains the above referenced amount of NCeONP macro-structures, i.e., preferably in the range of 0.01% (wt.) to 10.0% (wt). It is contemplated herein that the level of NCeONP macro-structures present in a selected clear coating formulation may therefore range of 0.01% (wt.) to 10.0% (wt.), or 0.01% (wt.) to 9.0% (wt.), or 0.01% (wt.) to 8.0% (wt.), or 0.01% (wt.) to 7.0% (wt.) or 0.01% (wt.) to 6.0% (wt.), or 0.01% (wt.) to 5.0% (wt.), or 0.01% (wt.) to 4.0% (wt.), or 0.01% (wt) to 3.0% (wt.), or 0.01% (wt.) to 2.0% (wt.) or 0.01% (wt.) to 1.0% (wt.).

To ensure that the paint or coating formulations prepared herein would have acceptable rheological behavior for a paint or coating application, the representative formulations were evaluated for their viscosity behavior. Table 2 below provides the measured Stormer Viscosity, in Krebbs units (KU), utilizing a Stormer-Type Viscometer (ASTM D562-01) (2005).

TABLE 2

| Sample | PVC | Paint | Emulsion | Type | Stormer Viscosity O/N KU | Stormer Viscosity 1 Month KU |
|---|---|---|---|---|---|---|
| PAINT 1 | HIGH PVC (76%) | PAINT W/O | SA W/O | BLANK | 98 | 96 |
| PAINT 2 | HIGH PVC (76%) | PAINT WITH | SA W/O | TEST | 98.1 | 97 |
| PAINT 3 | HIGH PVC (76%) | PAINT W/O | AA W/O | BLANK | 97.4 | 95 |
| PAINT 4 | HIGH PVC (76%) | PAINT WITH | AA W/O | TEST | 95.7 | 94 |
| PAINT 5 | LOW PVC (76%) | PAINT W/O | AA W/O | BLANK | 109.5 | 105 |
| PAINT 6 | LOW PVC (33%) | PAINT WITH | SA W/O | TEST | 107.6 | 108 |
| PAINT 7 | LOW PVC (33%) | PAINT W/O | AA W/O | BLANK | 131.7 | 122 |
| PAINT 8 | LOW PVC (33%) | PAINT WITH | AA W/O | TEST | 113.8 | 105 |

In the above Table 2, reference to PAINT WITH is reference to with NCeONP macro-structures, reference to PAINT W/O, is reference to without NCeONP macro-structures, reference to SA W/O is reference to without NCeONP macro-structures, reference to AA W/O is reference to without NCeONP macro-structures, reference to SA WITH is reference to with NCeONP macro-structures, reference to AA WITH is reference to with NCeONP macro-structures, and reference to O/N is reference to overnight.

Representative paint formulations herein were then evaluated for weathering performance pursuant to ASTM G154 (QUV accelerated weathering). In sum, 6.0×3.0 inch cement fiber panels were treated with a standard exterior primer coat followed by the Paint Samples identified herein. Maturation was set to 7 days minimum at ambient temperature. The panels were then tested pursuant to ASTM G154 for a duration of 1000 hours. The results are summarized in Table 3 and Table 4 below:

TABLE 3

ASTM G154 QUV Accelerated Weathering

| Sample | PVC Type | Emulsion | NCeONP Macrostructures % wt. | Mean ΔE 400 hrs | Mean ΔE 816 hrs | Mean ΔE 1060 hrs | Gloss 20° Exp/Unexp | Gloss 60° Exp/Unexp | Gloss 85° Exp/Unexp |
|---|---|---|---|---|---|---|---|---|---|
| Panel 1 | HIGH PVC (76%) | Styrene Acrylate | No | 1.46 | 2.9 | 3.64 | 1.3/1.3 | 2.3/2.2 | 1.1/1.2 |
| Panel 2 | HIGH PVC (76%) | Styrene Acrylate | Yes 1.0 | 1.23 | 2.23 | 1.94 | 1.2/1.2 | 2.3/2.1 | 1.7/1.4 |
| Panel 3 | HIGH PVC (76%) | Pure Acrylate | No | 0.42 | 0.67 | 0.91 | 1.3/1.3 | 2.3/2.2 | 1.7/1.2 |
| Panel 4 | HIGH PVC (76%) | Pure Acrylate | Yes 1.0 | 0.45 | 0.54 | 0.91 | 1.3/1.3 | 2.4/2.2 | 1.7/1.4 |
| Panel 5 | LOW PVC (33%) | Styrene Acrylate | No | 1.13 | 2.33 | 2.83 | 2.3/1.4 | 11.7/7.3 | 10.9/14.3 |
| Panel 6 | LOW PVC (33%) | Styrene Acrylate | Yes 1.0 | 1.02 | 1.91 | 2.34 | 3.0/1.4 | 16.4/6.8 | 16.3/17.6 |
| Panel 7 | LOW PVC (33%) | Pure Acrylate | No | 0.41 | 0.98 | 0.99 | 2.0/1.6 | 10.9/8.8 | 16.3/18.0 |
| Panel 8 | LOW PVC (33%) | Pure Acrylate | Yes 1.0 | 0.56 | 1.29 | 1.72 | 2.1/1.4 | 4.8/5 | 14.0/20.0 |

TABLE 4

ASTM G154 QUV Accelerated Weathering

| Panels | PVC Type | Emulsion | NCeONP Macrostructures % (wt.) | Mean ΔE 400 hrs | Mean ΔE 600 hrs | Mean ΔE 816 hrs | Mean ΔE 1060 hrs | Gloss 20° Exp/Unexp | Gloss 60° Exp/Unexp |
|---|---|---|---|---|---|---|---|---|---|
| Panel 9 | HIGH PVC (76%) | Styrene Acrylate | 0.25% | 0.80 | 0.90 | 1.2 | 1.6 | 1.1/1.2 | 2.2/2.3 |
| Panel 10 | HIGH PVC (76%) | Styrene Acrylate | 0.5% | 0.80 | 1.10 | 1.6 | 1.8 | 1.2/1.2 | 2.2/2.3 |
| Panel 11 | HIGH PVC (76%) | Styrene Acrylate | 1.0% | 0.60 | 1.10 | 1.5 | 1.7 | 1.2/1.2 | 2.2/2.3 |
| Panel 12 | HIGH PVC (76%) | Styrene Acrylate | 0.0% | 0.60 | 1.00 | 1.7 | 2.1 | 1.2/1.2 | 2.3/2.3 |

Reference in the above Table 3 and Table 4 to mean ΔE is reference to the amount of change the color has undergone during the accelerated weathering. Reference to gloss at the indicated angles for both exposed and unexposed is reference to the observed gloss at the indicated angle of light where higher represents a relatively higher amount of reflection.

From the above, the following observations can be made from Table 3: (1) for the High (76%) PVC utilizing a styrene-acrylate emulsion, at 400 hours, the delta E average value is lower (better) at 1.23 for the formulation utilizing NCeONP macro-structures versus 1.46 for the paint that does not contain such macrostructures; (2) For the Low (33%) PVC utilizing a styrene-acrylate emulsion, at 400 hours, the delta E average value is lower (better) at 1.02 for the formulation utilizing the NCeONP macro-structures versus 1.13; (3) for the High (76%) PVC utilizing a styrene-acrylate emulsion, at 800 hours, the delta E average value is lower (better) at 2.23 for the formulation utilizing NCeONP macro-structures versus 2.9 for the paint that does not contain such macrostructures; (4) For the Low (33%) PVC utilizing a styrene-acrylate emulsion, at 400 hours, the delta E value is lower (better) at for the formulation utilizing the NCeONP macro-structures versus 1.13; and (5) with regards to gloss testing, the addition of the NCeONP macro-structures did not adversely affect the gloss of the identified paint formulations; (6) for the High (76%) PVC utilizing a styrene-acrylate emulsion, at 1060 hours, the delta E average value is lower (better) at 1.94 for the formulation utilizing NCeONP macro-structures versus 1.46 for the paint that does not contain such macrostructures; (7) the NCeONP macro-structures does not adversely impact gloss of the paint in high PVC paints and the trend in low PVC paints is within tolerance limits when compared to paint formulations where the NCeONP macro-structures are not present.

Table 4, which includes additional testing, again shows the trend of the NCeNP macrostructures to improve mean ΔE values over the period of 400 hours to 1060 hours, where the improvement becomes more pronounced at longer duration (lower values compared to panel 12 with no loading) and with no adverse impact on gloss.

Corrosion testing of the representative paint formulations herein, containing the NCeONP macrostructures followed. The testing protocol was ASTM D 1654-08 which test method covers the treatment of previously coated specimens for accelerated and atmospheric exposure tests and their subsequent evaluation in respect to corrosion, blistering associated with corrosion, loss of adhesion at a scribe mark, or other film failure.

Seven representative emulsion samples were prepared as follows:
1. Control sample of Styrene Acrylate emulsion (50% solids) without NCeONP macrostructures.
2. Emulsion of Styrene Acrylate (50% solids)—During the emulsion polymerization of styrene and acrylate monomers, 1.0% (wt.) NCeONP macro-structures was added.
3. Emulsion of Styrene Acrylate (50% solids)—1.0% (wt.) NCeONP macro-structures were added to the emulsion post polymerization
4. Control Sample of Pure Acrylate emulsion (50% solids) without NCeONP macro-structures.
5. Emulsion of Pure Acrylate (50% solids)—During the emulsion polymerization of the pure acrylate 1.0% (wt.) NCeONP was added (referred as In-Situ preparation-details given separately below under point no. 17).
6. Pure Acrylate emulsion (50% solids)—1.0% (wt.) NCeONP macro-structures were added to the emulsion post its polymerization
7. Styrene Acrylate emulsion with solids of 50.0% and 1.0% (wt.) NCeONP macrostructures added post polymerization.

In order to prepare a clear coat, using each emulsion sample above, the following formulation was made:

TABLE 5

Clear Coat Formulation Details

| No. | Ingredients | Quantity (grams) |
|---|---|---|
| 1 | Emulsion taken | 35.0 |
| 2 | Texanol (Coalescent taken at 5% of solids in emulsion) | 0.85 |
| 3 | Sodium Nitrite (10% aqueous wt/wt) | 0.70 |
| 4 | Thickener-HASE (Hydrophobicity modified Alkali Swellable Emulsion)-BASF Rheovis 1181 | 0.70 |
| 5 | Thickener-Polyurethane (PU) base-Arkema's Coapur 830 | 0.105 |
|  | Total clear coat base | 37.355 |

The NCeONP macrostructures in each formulation was therefore now 0.0937% (wt.).

Each clear coat sample was coated on mild steel (MS) sheet panel (6.0 inches×3.0 inches) on both sides with a wet film thickness (WFT) of 300 microns. The border of each panel was sealed by epoxy paint. After natural curing for 7 days, the 7 panels were placed in a salt spray chamber at 20° inclination to vertical. Inside the chamber, temperature was maintained at 37° C. along with a fog of 5% NaCl solution that was atomised to fill the chamber. This was set for 50 hours each batch for 4 continuous testing runs totalling to 200 hours.

Figure 5:
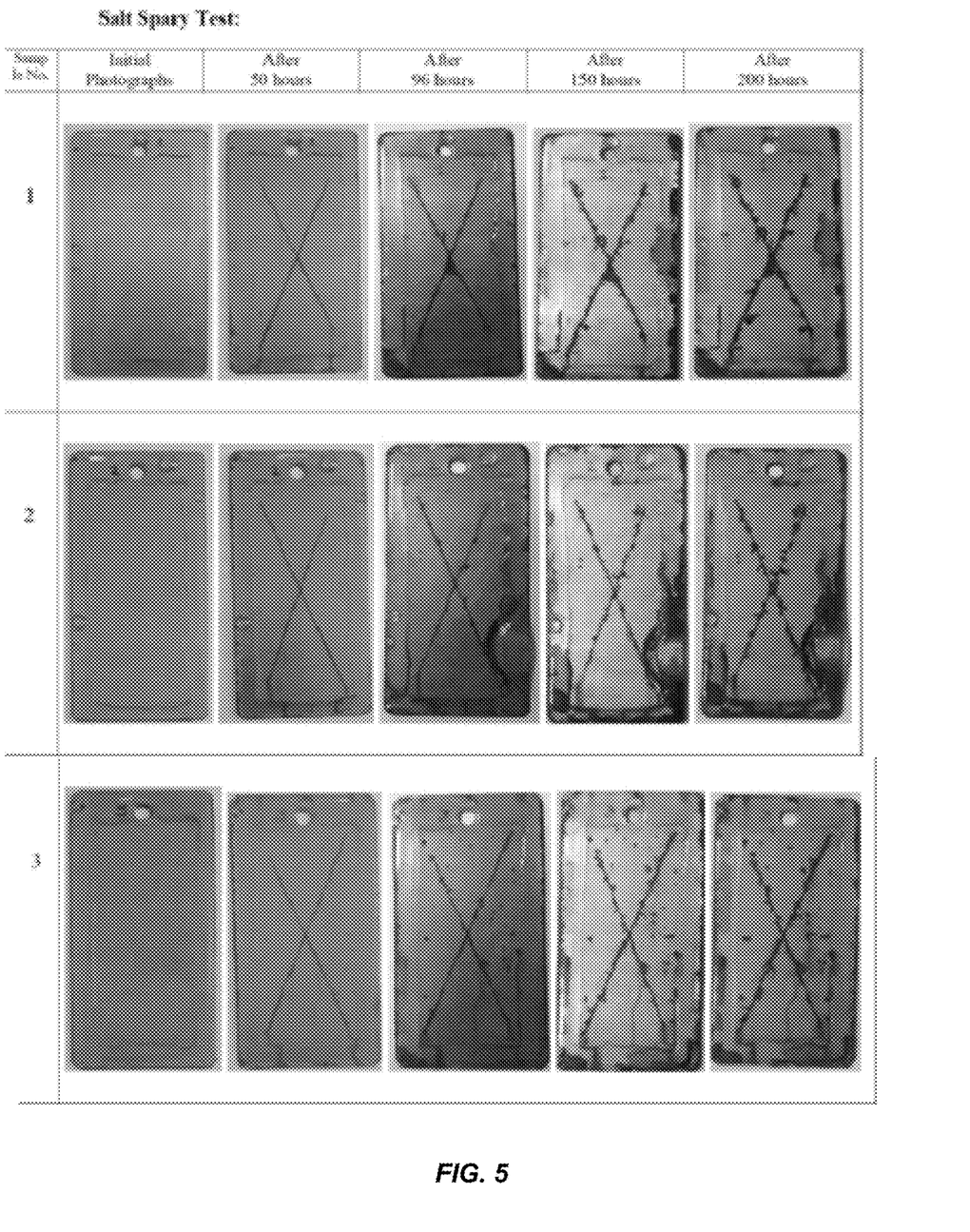
FIG. 5 shows the results of corrosion testing of sample panels 1, 2 and 3.
Figure 6:
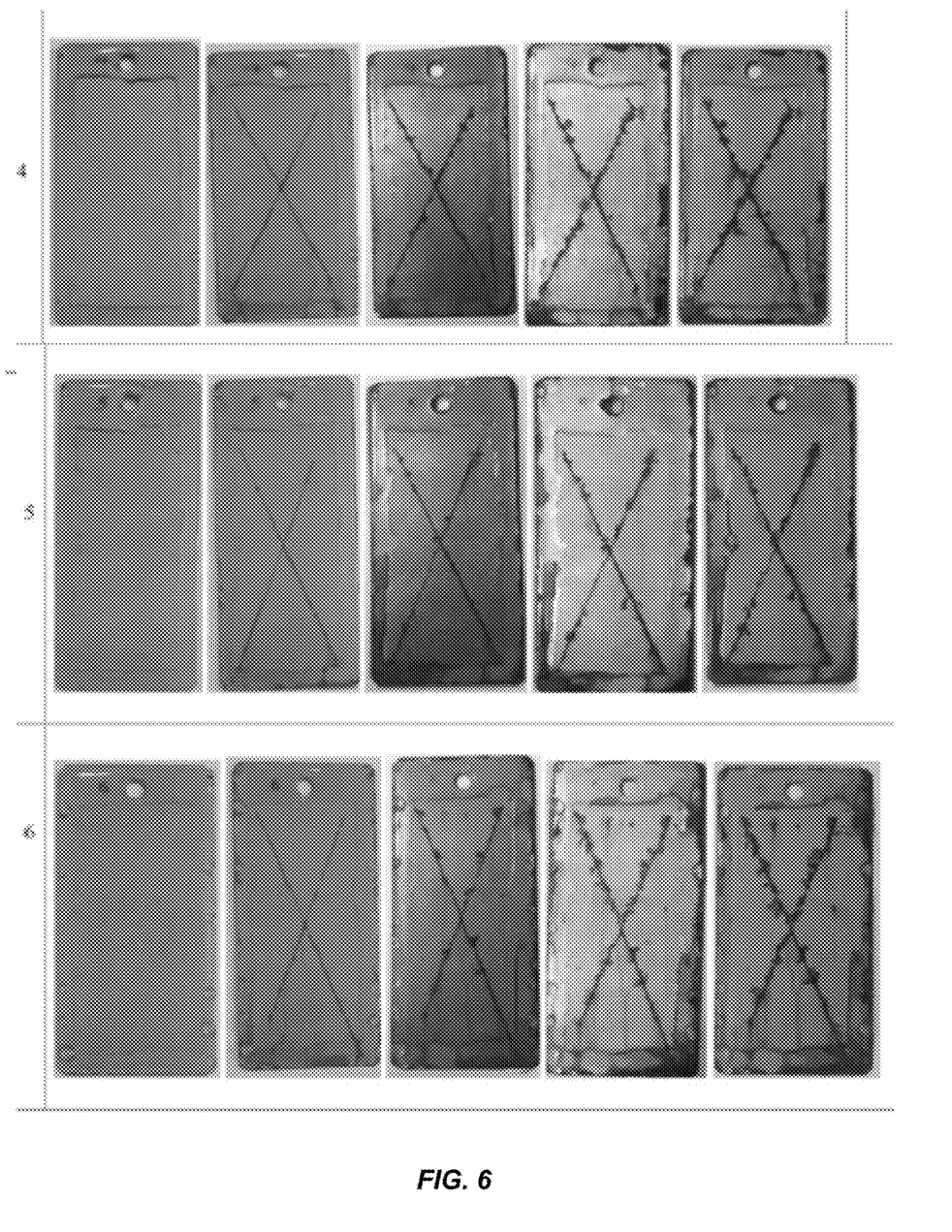
FIG. 6 shows the results of corrosion testing of sample panels 4, 5 and 6.
Figure 7:
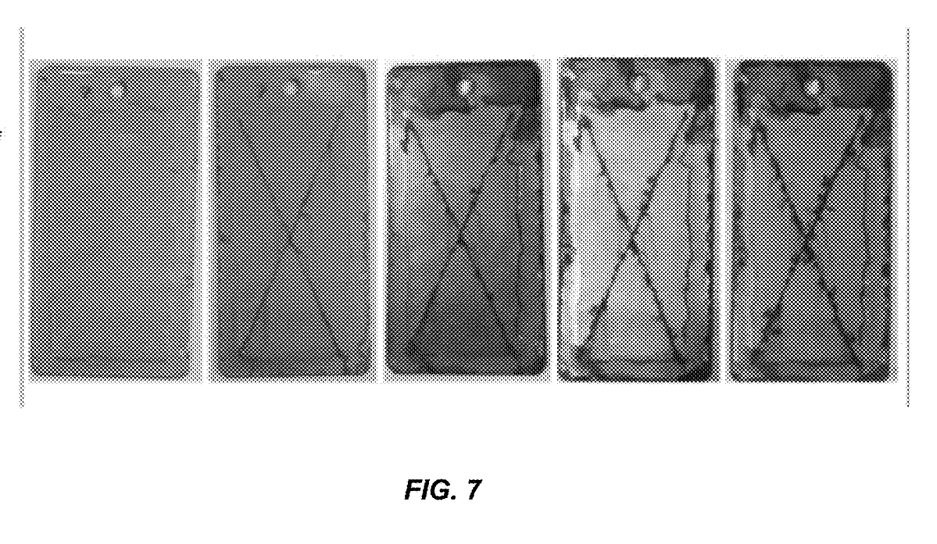
FIG. 7 shows the results of corrosion testing of sample panel 7.

Table 6 below provides the results of the corrosion testing. FIG. 5 shows the sample panels 1, 2 and 3 at the identified intervals, FIG. 6 shows sample panels 4, 5 and 6 at the same intervals, and FIG. 7 shows sample panel 7 at the same intervals.

TABLE 6

Corrosion Testing Results

| Panels | Description | Final Dry Film Thickness (% of original) | Corrosion Under Coating (mm) as per ASTM D 1654 | Comparative Ratings Visual |
|---|---|---|---|---|
| Panel 1 | Control of pure acrylate emulsion (50% solids) without NCeONP macro-structures | 70.25 | 2.453 | 6 |
| Panel 2 | Pure acrylate emulsion (50% solids) with NCeONP, macro-structures incorporated during polymerization | 55.75 | 2.979 | 8 |
| Panel 3 | Pure acrylate emulsion (50% solids) with NCeONP macrostructures, incorporated post polymerization | 58.75 | 2.522 | 7 |
| Panel 4 | Styrene-acrylate emulsion (50% solids) without NCeONP macro-structures | 69.25 | 3.837 | 6 |
| Panel 5 | Styrene-acrylate emulsion (50% solids) with NCeONP macrostructures, incorporated during polymerization | 91.25 | 2.011 | 9 |

TABLE 6-continued

Corrosion Testing Results

| Panels | Description | Final Dry Film Thickness (% of original) | Corrosion Under Coating (mm) as per ASTM D 1654 | Comparative Ratings Visual |
|---|---|---|---|---|
| Panel 6 | Styrene-acrylate emulsion (40% solids) with NCeONP macrostructures incorporated post polymerization | 74.25 | 2.051 | 6.5 |
| Panel 7 | Styrene-acrylate emulsion (40% solids) with NCeONP macrostructures incorporated during polymerization | 57.00 | 2.103 | 7 |

In Table 6, the comparative visual rankings, which considers blistering, cracking and rusting due to placement of an "X" mark on the panel (see FIGS. 5-7), wherein higher numbers indicate relatively less blistering, cracking and rusting, confirmed that Panels 2 and 3, containing the identified NCeONP macro-structures in the pure acrylate emulsion, out-performed Control Panel 1. In addition, Panels 5-7, which identify the NCeONP macro-structures in a styrene-acrylate emulsion, on average out-performed Control Panel 4.

From the above, the cerium oxide nanoparticle macro-structures herein, comprising a plurality of cerium oxide nanoparticles having a diameter in the range of 10 nm to 100 nm present as a macro-structure having macro-structure diameter in the range of 50 nm to 30,000 nm and macro-structure pore diameter in the range of 10 nm to 1100 nm, have been demonstrated to prolong and maintain the stability of paint or coating formulations with regards to weathering and corrosion resistance.

What is claimed:

1. A paint or coating formulation comprising:
nanoporous cerium oxide nanoparticle macro-structure, in a liquid media, comprising a plurality of cerium oxide nanoparticles having a diameter in the range of 10 nm to 100 nm present as a macro-structure, where the cerium oxide nanoparticles adhere to one another to form the nanoporous cerium oxide nanoparticle macro-structure having a macro-structure diameter in the range of 50 nm to 30,000 nm and a macro-structure pore diameter in the range of 10 nm to 1100 nm, wherein said nanoporous cerium oxide nanoparticle macro-structure is present in said paint or coating formulation at a level of 0.01% wt. to 10.0% wt., wherein said liquid media comprises a polymer emulsion, and wherein said paint or coating formulation comprises a pigment or dye.

2. The paint or coating formulation of claim 1 wherein said liquid media comprises the polymer emulsion containing a polystyrene-polyacrylate copolymer.

3. The paint or coating formulation of claim 1 wherein said plurality of cerium oxide nanoparticles have a diameter in the range of 10 nm to 50 nm.

4. The paint or coating formulation of claim 1 wherein said plurality of cerium oxide nanoparticles have a diameter in the range of 10 nm to 30 nm.

5. The paint or coating formulation of claim 1 wherein said plurality of cerium oxide nanoparticles have a diameter in the range of 20 nm to 30 nm.

6. The paint or coating formulation of claim 1 wherein said macro-structure pore diameter is in the range of 10 nm to 750 nm.

7. The paint or coating formulation of claim 1 wherein said macro-structure pore diameter is in the range of 10 nm to 500 nm.

8. The paint or coating formulation of claim 1 wherein said macro-structure pore diameter is in the range of 10 nm to 250 nm.

9. The paint or coating formulation of claim 1 wherein said macro-structure pore diameter is in the range of 10 nm to 100 nm.

10. The paint or coating formulation of claim 1 wherein said macro-structure pore diameter is in the range of 10 nm to 50 nm.

11. The paint or coating formulation of claim 1 wherein said macro-structure pore diameter is in the range of 10 nm to 25 nm.

12. A method of forming the paint or coating formulation of claim 1 comprising:
(a) supplying said nanoporous cerium oxide nanoparticle macro-structure; and
(b) forming said polymer emulsion by polymerizing one or a plurality of monomers in aqueous medium in the presence of an emulsifier and during said polymerization, adding said nanoporous cerium oxide nanoparticle macrostructure.

13. The method of claim 12 wherein said one or a plurality of monomers comprise styrene and acrylate monomers.

14. The method of claim 12 wherein said one or a plurality of monomers comprise acrylate monomer.

15. A method of forming the paint or coating formulation of claim 1 comprising:
(a) supplying said nanoporous cerium oxide nanoparticle macro-structure; and
(b) supplying said polymer emulsion and adding said nanoporous cerium oxide nanoparticle macro-structure to said polymer emulsion.

16. The method of claim 15 wherein said polymer emulsion comprises a polystyrene-polyacrylate copolymer emulsion.

17. The method of claim 12 wherein said polymer emulsion comprises a polyacrylate emulsion.

18. A paint or coating formulation comprising:
(a) nanoporous cerium oxide nanoparticle macro-structure comprising a plurality of cerium oxide nanoparticles having a diameter in the range of 10 nm to 100 nm present as a macro-structure, wherein the cerium oxide nanoparticles adhere to one another to form the nanoporous cerium oxide nanoparticle macro-structure having: (1) a macro-structure diameter in the range of 10 nm to 300 nm and a macro-structure pore diameter in the range of 5 nm to 30 nm; and (2) a macro-structure diameter in the range of 5,000 nm to 30,000 nm and a macro-structure pore diameter in the range of 900 nm to 1100 nm; and (b) a liquid media comprising a polymer emulsion.

19. The paint or coating formulation of claim 18 wherein said nanoporous cerium oxide nanoparticle macro-structure is present in said paint or coating formulation at a level of 0.01% wt. to 10.0% wt.

20. The paint or coating formulation of claim 18 wherein said paint or coating formulation further comprises pigment or dye.

21. The paint or coating formulation of claim 18 wherein said liquid media comprises the polymer emulsion containing a polystyrene-polyacrylate copolymer.

* * * * *